US009000245B2

United States Patent
O'Connor et al.

(10) Patent No.: US 9,000,245 B2
(45) Date of Patent: *Apr. 7, 2015

(54) PROCESS FOR THE CONVERSION OF BIOMASS TO LIQUID FUELS AND SPECIALTY CHEMICALS

(75) Inventors: Paul O'Connor, Hoevelaken (NL); Dennis Stamires, Dana Point, CA (US); Sjoerd Daamen, Barcelona (ES)

(73) Assignee: KiOR, Inc., Pasadena, TX (US)

( * ) Notice: Subject to any disclaimer, the term of this patent is extended or adjusted under 35 U.S.C. 154(b) by 742 days.

This patent is subject to a terminal disclaimer.

(21) Appl. No.: 13/195,493

(22) Filed: Aug. 1, 2011

(65) Prior Publication Data
US 2012/0190062 A1  Jul. 26, 2012

Related U.S. Application Data

(63) Continuation of application No. 12/299,316, filed as application No. PCT/EP2007/054378 on May 4, 2007, now Pat. No. 8,022,260.

(60) Provisional application No. 60/837,915, filed on Aug. 16, 2006, provisional application No. 60/850,256, filed on Oct. 10, 2006.

(30) Foreign Application Priority Data

May 5, 2006 (EP) ..................................... 06113564

(51) Int. Cl.
*C07C 1/00* (2006.01)
*C10G 1/02* (2006.01)
*C10G 1/00* (2006.01)

(52) U.S. Cl.
CPC ........ *C10G 1/02* (2013.01); *C10G 1/006* (2013.01); *C10G 2300/1014* (2013.01); *C10G 2300/4006* (2013.01); *C10G 2300/4081* (2013.01)

(58) Field of Classification Search
USPC .......... 585/240, 242; 201/2.5, 21, 31; 44/605, 44/606; 162/71, 77, 24
See application file for complete search history.

(56) References Cited

U.S. PATENT DOCUMENTS 2,177,557 A * 10/1939 Bergstrom et al. ........... 562/515
2,495,396 A    1/1950 Urison et al.
(Continued)

FOREIGN PATENT DOCUMENTS

EP    1719811    * 11/2006
WO   0220699        3/2002

OTHER PUBLICATIONS

Karagoz Selhan et al: "Low-Temperature Hydrothermal Treatment of Biomass: Effect of Reaction Parameters on Products and Boiling Point Distributions", Energy Fuels; Energy & Fuels; Jan./Feb. 2004, vol. 18, No. 1, Jan. 2004, pp. 234-241, EP002401194.
(Continued)

*Primary Examiner* — Nina Bhat
(74) *Attorney, Agent, or Firm* — Hovey Williams LLP

(57) ABSTRACT

A process is disclosed for converting biomass to fuels and/or valuable chemicals. The process comprises the steps of a) activating biomass to make it more susceptible to conversion; c) partially converting the biomass to a solubilized material; and d) subjecting the unconverted biomass to a second conversion step. The process optionally comprises a step b) of adding a solvent to the activated biomass. In a preferred embodiment the solubilized biomass obtained in step c) is removed before the unconverted biomass is subjected to step d).

38 Claims, 2 Drawing Sheets

(56) References Cited

U.S. PATENT DOCUMENTS

| | | | |
|---|---|---|---|
| 4,304,649 | A | 12/1981 | Han et al. |
| 4,556,430 | A | 12/1985 | Converse et al. |
| 4,594,130 | A | 6/1986 | Chang et al. |
| 4,797,135 | A * | 1/1989 | Kubat et al. ............... 44/500 |
| 5,536,325 | A | 7/1996 | Brink |
| 5,562,777 | A | 10/1996 | Farone et al. |
| 5,705,216 | A | 1/1998 | Tyson |
| 5,865,898 | A * | 2/1999 | Holtzapple et al. ........... 127/37 |
| 6,770,168 | B1 * | 8/2004 | Stigsson ................... 162/24 |
| 7,262,331 | B2 | 8/2007 | van de Beld et al. |
| 8,022,260 | B2 * | 9/2011 | O'Connor et al. ........... 585/242 |
| 8,465,627 | B2 * | 6/2013 | Brady et al. ............... 201/2.5 |
| 2004/0180971 | A1 | 9/2004 | Inoue et al. |
| 2006/0272554 | A1 | 12/2006 | Jardine et al. |

OTHER PUBLICATIONS

Chinese Office Action and English translation dated Jan. 14, 2013 for corresponding Chinese Patent Application No. 200780020346.6, filing date May 4, 2007; 10 pages.

Canadian Office Action for related Canadian Patent Application No. 2,651,475; Applicant: KiOR, Inc.; Dated Jul. 22, 2013, 4 pages.

Chinese Office Action for related Chinese Patent Application No. 200780020346.6; Applicant: KiOR, Inc.; Dated Oct. 17, 2011, 7 pages.

Chinese Office Action for related Chinese Patent Application No. 200780020346.6; Applicant: KiOR, Inc.; Dated Jun. 26, 2012, 2 pages.

Chinese Office Action for related Chinese Patent Application No. 200780020346.6; Applicant: KiOR, Inc.; Dated May 15, 2013, 14 pages.

European Office Action for related European Patent Application No. 07.728831.4; Applicant: KiOR, Inc.; Dated May 30, 2011, 8 pages.

International Search Report and Written Opinion for related PCT Patent Application No. PCT/EP2007/054378; Dated Nov. 15, 2007, 10 pages.

Russian Office Action for related Russian Patent Application No. 2008147899; Applicant: KiOR, Inc.; Dated Nov. 19, 2010, 10 pages.

Mexican Office Action for related Mexican Patent Application No. MX/a/2008/014178; Applicant: KiOR, Inc.; Dated Dec. 3, 2013, 3 pages.

* cited by examiner

PROCESS FOR THE CONVERSION OF BIOMASS TO LIQUID FUELS AND SPECIALTY CHEMICALS

This is a continuation of application Ser. No. 12/299,316, filed Nov. 3, 2008, which is based on PCT International Application PCT/EP2007/054378, filed May 4, 2007 which claims priority from U.S. Provisional Application No. 60/837,915 filed Aug. 16, 2006 and U.S. Provisional Application No. 60/850,256 filed on Oct. 10, 2006, and EP Application No. 06113564.6 filed on May 5, 2006, the entirety of each of the foregoing applications is hereby incorporated herein by reference.

BACKGROUND OF THE INVENTION

1. Field of the Invention

The present invention relates to the conversion of solid biomass to liquid fuels and specialty chemicals.

It has long been recognized that biomass, in particular biomass of plant origin, is abundantly available and is a potential source of liquid fuels and valuable chemicals. See, for example, "Energy production from biomass", by P. Mc.Kendry—Bioresource Technology 83 (2002) P 37-46, and "Coordinated development of leading biomass pretreatment technologies" by C. E. Wyman et al, Bioresource Technology 96 (2005) 1959-1966.

Refined biomass materials, such as vegetable oils, starches, and sugars, can almost completely be converted to liquid fuels such as biodiesel (methyl or ethyl esters of fatty acids) and ethanol. However, the use of these refined biomass materials as starting points for liquid fuels diverts precious food resources from animal and even human consumption. This makes these starting materials expensive, and also meets with ethical objections.

It is far more desirable to find a way for converting non-edible biomass to liquid fuels and valuable chemicals, in particular if this non-edible biomass does not at present have an economic use and is therefore considered "waste". Examples of such biomass materials include agricultural wastes, such as bagasse, straw, corn stover, corn husks and the like. Other examples include forestry wastes, such as wood chips and saw dust from logging operations or waste from paper and/or paper mills. What these materials have in common is that they contain significant amounts of lignocellulose and crystalline cellulose, making them resistant to chemical conversion and to fermentation. It is known that the biomass consists of three main components being lignin, amorphous hemi-cellulose and crystalline cellulose, assembled in such a compact manner that makes it less accessible and therefore less susceptible to chemical and/or enzymatic conversion.

2. Description of the Related Art

Various processes have been proposed for converting non-edible biomass to liquid fuels, animal feeds, and chemicals. Generally speaking, these processes fall into one of the following categories:

Hydrothermal Upgrading (HTU); see references
"Process for the production of liquid fuels from biomass" by Van den Beld et al WO 02/20699 A1
"Developments in direct thermochemical liquefaction of biomass 1983-1990" by D. C. Elliott et al., Energy & Fuels 1991, 5, 399-410
"A literature survey of intermediate products formed during the thermal aqueous degradation of cellulose" Polym. Plast. Technology. Eng 11, (2), 127-157 (1978)
Pyrolysis; see reference
"Pyrolysis of Wood/Biomass for Bio-Oil: A critical Review" by D. Mohan et al., Energy & Fuels 2006, 20, P 848-889
Gasification (followed by Fischer Tropsch synthesis).
"Chemical Processing in High-pressure Aqueous Environments—Development of Catalysts for Gassification" by D. C. Elliott et al, Ind. Eng. Chem. Res. 1993, 32, 1542-1548
Acid hydrolysis
Schmidt et al "Hydrolysis of biomass material" US2002/0117167 A1
Enzymatic fermentation.
See for instance reference: "A review of the production of ethanol from softwood" by M. Galbe et al., Biomedical and Life Sciences, vol 59, no 6, September 2002

Hydrothermal Upgrading (HTU) refers to processes whereby biomass is reacted with liquid water at elevated temperature (well above 200° C.) and pressure (50 bar or higher). The high temperatures and pressures that are needed to obtain suitable conversion rates make these processes expensive, requiring special high pressure equipment constructed with special metal alloys which for commercial plants, are difficult to operate and have relatively short life times. In addition, the products obtained in HTU processes are heavily degraded because of polymerization and coke formation that take place under the prevailing reaction conditions. The liquid products obtained by HTU processes tend to be highly acidic and corrosive, and unstable.

Pyrolysis generally refers to processes carried out at high temperatures (500 to 800° C.) in the absence of oxygen, or with so little oxygen present that little or no oxidation takes place. The resulting liquid products are of poor quality, heavily degraded, and low pH, and require extensive (hydro-)treatment for upgrading to transportation fuels or chemical feedstocks.

It is desirable to develop a process for converting biomass under much milder conditions than prevail in the traditional HTU and pyrolysis processes, in part to avoid the high cost of equipment necessary for operating under these conditions, and in part also to avoid the product degradation taking place under these more severe reaction conditions.

Gasification of biomass, followed by FT synthesis, is inherently expensive as it involves a complete breakdown of hydrocarbon material, followed by a synthesis of different hydrocarbons. This route involves a complex multi-step and therefore costly processing scheme.

Any economic biomass conversion process must be aimed at preserving the chemical structures present in the biomass as much as possible, to the extent consistent with the goal of making liquid fuels. The overall scheme should be simple and low in capital as well as operating costs.

Enzymatic fermentation is capable of converting only a relatively small portion of the available cellulose in biomass, generally on the order of 40%. The process is slow, requiring 24 hours or more per batch and operates best at low solid to liquid ratios. Accordingly, the process must be carried out in large fermentation vessels. The enzymes used in these processes are expensive when compared to the cost of chemicals used in chemical conversion processes.

Acid hydrolysis has been proposed as a precursor to enzymatic fermentation. The purpose is to provide an initial breakdown of (ligno-)cellulose, so that more of it is available for subsequent fermentation. Acid hydrolysis is carried out under atmospheric conditions and at temperatures below 100° C. The handling of large quantities of acid makes this process unattractive, in particular because the acid must be either removed or neutralized before the fermentation step. The formed salts adversely affect the subsequent fermentation process.

There is a need for a low-cost process that is able to convert a large proportion of the (ligno-)cellulosic material present in non-edible biomass under conditions that are mild enough to avoid high equipment and energy costs and/or substantial degradation of the conversion products.

Biomass in general represents a composite comprising mainly lignin, amorphous hemi-cellulose and crystalline cellulose, which are assembled in a strong compact form, which due to the lack of accessibility is resistant to chemical treatments, impregnation, and dissolution. It is highly desirable to develop means to dissociate these three main components from the composite and develop susceptibility which will allow chemical reactions and subsequent conversions to take place. Our invention provides means to accomplish this by using a two step process: a) Breaking down/dissociation of the components within the composite and developing susceptibility. b) Reacting the individual components appropriately using physical, mechanical, thermal and chemical means for the efficient conversion to fuels and chemicals.

SUMMARY OF THE INVENTION

The present invention relates to a process for converting biomass to a liquid fuel comprising the steps of:
a) activating the biomass to make it more susceptible to conversion;
b) optionally, adding a solvent;
c) partially converting the activated biomass to form a mixture of solubilized material and unconverted biomass;
d) subjecting unconverted biomass from step c) to a conversion process.

Due to the activation taking place in step a), optionally aided by the addition of a solvent (step b), step c) can be carried out under mild conditions. As a result the product obtained in step c) is not substantially degraded. Unconverted biomass from step c) is subsequently subjected to a second conversion in step d). Optionally, and preferably, converted biomass obtained in step c) is removed from the unconverted biomass before the latter is subjected to a second conversion in step d). If conversion products from step c) are first removed, step d) may be carried out under more severe conditions than step c). In the alternative, step d) may be preceded by a second activation step so that the unconverted biomass is more susceptible to the conversion process of step d).

DESCRIPTION OF ILLUSTRATIVE EMBODIMENTS

Figure 1:
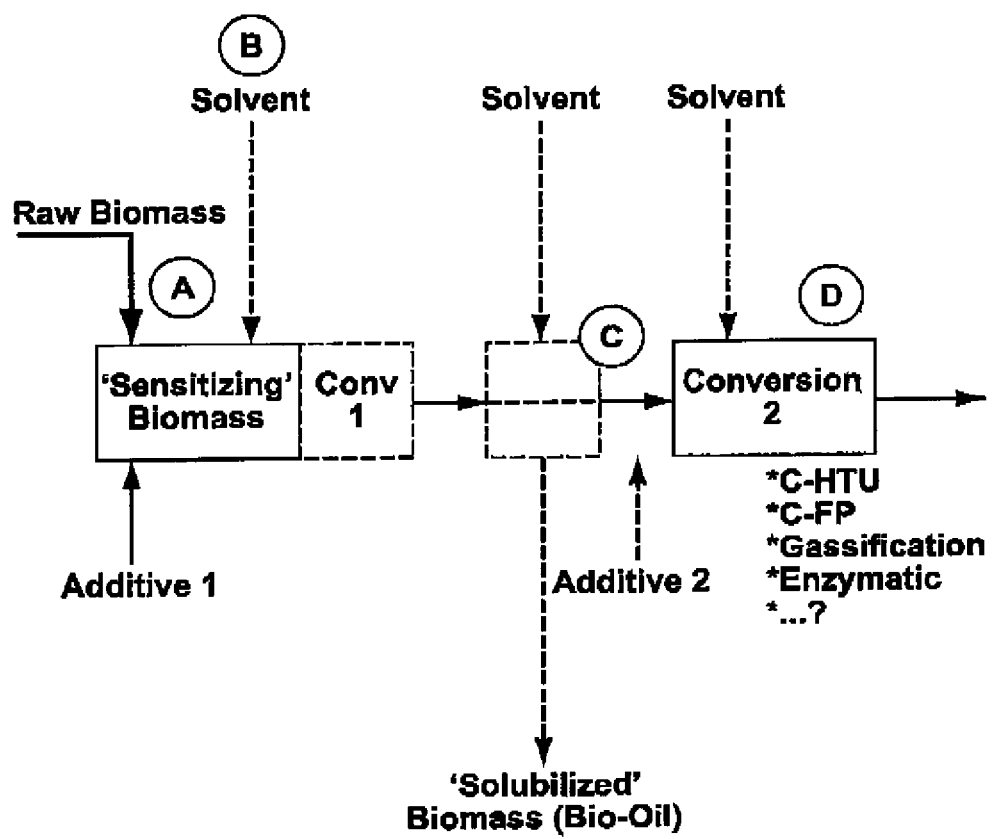
FIG. 1 is a schematic diagram of an embodiment of the process of the present invention.
Figure 2:
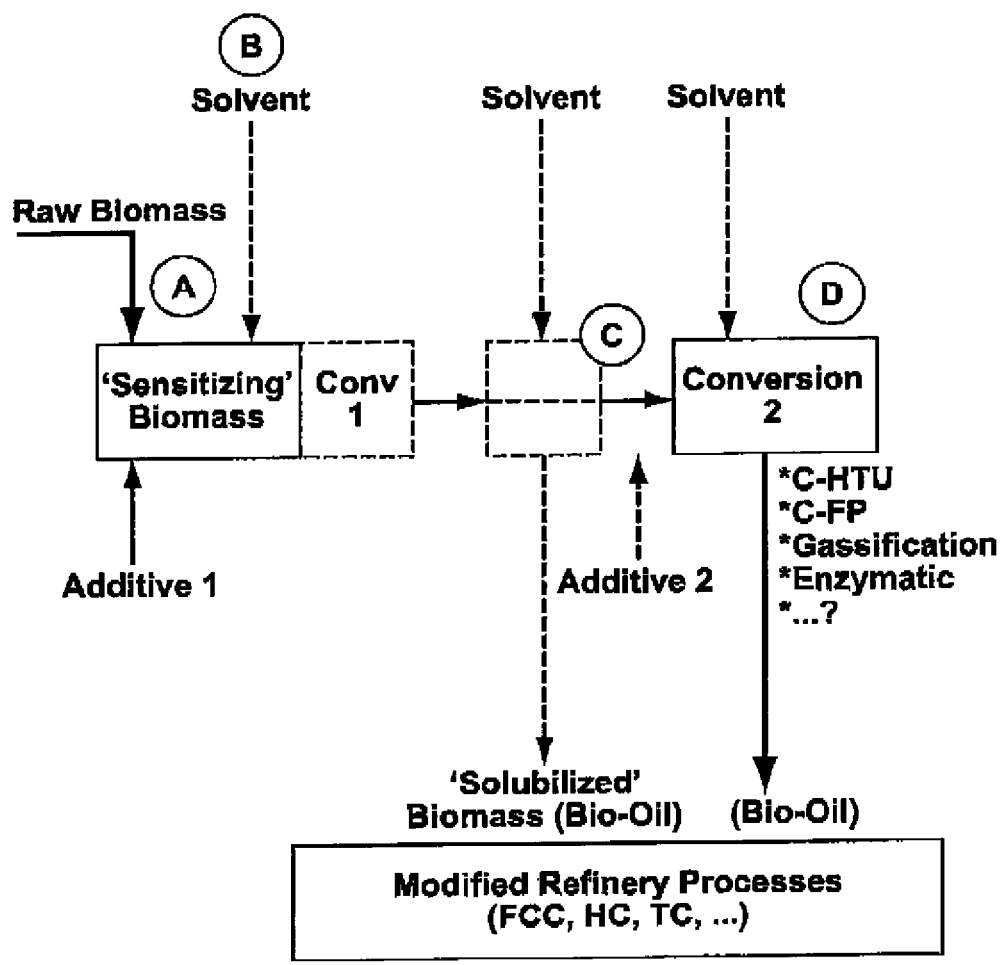
FIG. 2 is a schematic diagram of an alternate embodiment of the process of the present invention.

The following is a description of certain embodiments of the invention, given by way of example only.

The present invention relates to a process for converting biomass to a liquid fuel comprising the steps of:
a) activating the biomass to make it more susceptible to conversion;
b) optionally, adding a solvent;
c) partially converting the activated biomass to form a mixture of solubilized material and unconverted biomass;
d) subjecting unconverted biomass from step c) to a conversion process.

The process provides the general advantage of requiring less severe process conditions than, for example, traditional HTU or pyrolysis processes. Accordingly, the process is more cost-effective and requires simpler less expensive equipment. The process is also environmentally more acceptable, and produces product of higher quality, and more suitable for conversion to fuels and chemicals.

Particular embodiments of the process provide homogenous, intimate mixtures of biomass material with a solvent and/or a solid and/or a liquid additive, which provides advantages for subsequent conversion.

In a preferred embodiment the biomass material is sensitized. Because the sensitized material has an increased susceptibility to hydrothermal conversion, the hydrothermal conversion itself may be carried out at a lower temperature and pressure than is normally employed for this type of reaction.

There are various ways in which the carbon based energy carrier material may be sensitized prior to the hydrothermal conversion step itself.

One process involves providing particles of the carbon based energy carrier material, and coating these particles with smaller particles of a catalytic material. The coated particles are subjected to thermal treatment, during which the energy carrier material becomes sensitized. This process is disclosed in detail in our copending patent application entitled "Pretreatment of particulate carbon-based energy carrier material", the disclosures of which are incorporated herein by reference.

Another process for sensitizing the carbon based energy carrier material is suitable for energy carrier materials that contain a polymer of photosynthetic origin. In this process, small particles of an inorganic material are embedded within the polymeric material of photosynthetic origin. This process is disclosed in detail in our co-pending patent application entitled "Method of making a polymeric material of photosynthetic origin comprising particulate inorganic material", the disclosures of which are incorporated herein by reference.

Yet another process for sensitizing the carbon based energy carrier material comprises the step of contacting the carbon based energy carrier material with reaction products obtained in step b) of the process of the present invention. It will be understood that when the process is started no reaction product is yet available. Therefore, at this stage, the carbon based energy carrier material may be sensitized by some other method. It is also possible to start the reaction with nonsensitized material, and carry out the hydrothermal conversion step under conventional conditions of temperature and pressure.

For example, the reaction may be started at a temperature of up to 370 degrees centigrade, and a pressure of about 200 bar, or preferably with superheated steam ("dry steam"), producing a reaction product that is practically suitable for mixing with the carbon based energy carrier material for sensitization purposes. Once enough reaction product is formed to operate the reaction with a continuous supply of sensitized material, the hydrothermal conversion conditions can then be changed to a temperature of less than 300 degrees centigrade and A pressure of less than 50 bar.

In a further preferred embodiment the sensitizing step a) comprises the step of subjecting the energy carrier material to a pH swing of at least 4 pH units. In one embodiment, the pH swing is produced by first exposing the carbon-based energy carrier material to a pH of less than 6, and increasing the pH to more than 8, with the proviso that the pH change be at least 4 pH units. For example, if the acidic pH is 6, the pH is increased to at least 10; if the acidic pH is 5, the pH is increased to at least 9; etc.

In an alternate embodiment the pH swing is produced by first exposing the carbon-based energy carrier material to a pH of more than 8, and lowering the pH to less than 6, with the proviso that the pH change be at least 4 units. For example, if the alkaline pH is 8, the pH is lowered to 4 or less; if the alkaline pH is 9, the pH is lowered to 5 or less; etc.

In a particularly preferred embodiment the pH swing comprises the steps of first exposing the carbon-based energy carrier material to a pH of less than 3, and increasing the pH to more than 6.

Conveniently the pH swing is produced by respective additions to the carbon-based energy carrier material of an aqueous solution of an acid or a base. Suitable acids include mineral acids, in particular strong mineral acids such as such as hydrochloric acid, nitric acid, and sulfuric acid. Organic acids are also suitable, in particular organic acids as may be produced in the subsequent hydrothermal conversion of the energy carrier material, because of their abundant availability at the site where the process is carried out, and their compatibility with the other steps of the process.

Suitable bases include inorganic materials, in particular inexpensive inorganic materials such as potash, soda ash, caustic, and lime.

The subsequent additions of an acid and a base (or a base and an acid) to the energy carrier material results in the presence of a salt. In general the salt does not interfere with the subsequent hydrothermal conversion reaction. The hydrothermal conversion typically results in the formation liquid product comprising a water-rich phase and a hydrocarbon-rich phase, with virtually all of the salt present in the water-rich phase. The salt may be recovered from the water-rich phase by any suitable technique.

In a preferred embodiment the salt is embedded in the carbon-based energy carrier material in the form of small crystals. This is done by changing the conditions such that salt present in solution precipitates. In general, it is undesirable to deposit salt crystals on the outer surface of the particles of energy carrier material. Therefore, excess liquid is drained off first, leaving the energy carrier material soaked with a salt solution. Next, the conditions are changed to cause precipitation of the salt within the particles of energy carrier material. This change of conditions may be anything that causes precipitation of the specific salt, and may include, for example, a change in temperature, a change in pH, evaporation of the solvent (which, in most cases, is water), and combinations of such measures.

The salt crystals embedded within the particles of energy carrier material tend to break up or open up these particles, thereby contributing to the required sensitization of the energy carrier material to a subsequent hydrothermal treatment.

In an alternate embodiment the biomass is pretreated as follows in a process comprising the steps of:
a) providing the biomass material in particulate form;
b) preparing a slurry of the particulate biomass material and a solvent;
c) introducing into the slurry a particulate, insoluble inorganic material;

Suitably the source of the polymeric material is a form of agricultural or forestry waste. Examples include bagasse, sugar beet pulp, chopped straw, cotton linters, corn stalks, corn cobs, wood chips, saw dust, tree bark, grasses, and the like.

For the process of the invention the polymeric material is provided in particulate form, preferably having a mean particle diameter of less than 3 mm, preferably in the range of from 0.1 to 1 mm. In general this particulate material is prepared from larger particles by techniques such as milling, grinding, pulverization, and the like. However, it has been found that the process of the present invention is suitable for use with relatively coarse particulate polymeric material, so that this particle size reduction step may be omitted. For example, wood chips as are produced when trees are cut with a chain saw may be used in this process without further particle size reduction.

The particulate polymeric material is mixed with a solvent to form a slurry. Mixing may be carried out with any suitable mixer, such as a helical mixer, an impeller, a screw mixer, and the like. It may be desirable to employ a form of high shear mixing.

As it is desirable to operate at a low cost, in many cases water is a preferred solvent. However, other solvents may be available at low cost from other stages of the conversion process. For example, if the process of the present invention is integrated with a fermentation process, ethanol may be abundantly available at low cost. Also, the reaction product of the process of the present invention comprises a liquid phase, which can be separated into an aqueous phase and an organic phase. The aqueous phase comprises water and water-soluble organic compounds. This aqueous phase can be used as the solvent for making the slurry of step b), with or without prior removal of organic compounds contained therein.

The insoluble inorganic material, which is introduced into the slurry in step c), is preferably an alkaline material. Even more preferred are layered materials, or heat treated forms of layered materials.

The layered material is selected from the group consisting of smectites, anionic clays, layered hydroxy salts, and mixtures thereof. Highly preferred are Mg-Al and Ca-Al anionic clay.

Thermally treated layered materials are layered materials selected from the above group which have been thermally treated at a temperature in the range of about 300-900° C.

The particles containing the (thermally treated) layered material may additionally comprise other materials. Examples of such other materials are conventional catalyst components such as silica, alumina, aluminosilicates, zirconia, titania, boria, kaolin, acid leached kaolin, dealuminated kaolin, bentonite, (modified or doped) aluminum phosphates, zeolites (e.g. zeolite X, Y, REY, USY, RE-USY, or ZSM-5, zeolite beta, silicalites), phosphates (e.g. meta or pyro phosphates), sorbents, fillers, and combinations thereof.

Preferably, the particles also contain metals like W, Mo, Ni, Co, Fe, V, and/or Ceo Such metals may introduce a hydrotreating function into the particles (especially W, Mo, Ni, Co, and Fe) or enhance the removal of sulfur- and/or nitrogen-containing species (Zn, Ce, V).

The particles may be a spent (resid) FCC catalyst containing the (thermally treated) layered material. This would be very advantageous, as it involves the reuse of waste material. The spent catalyst may be ground of pulverized into smaller particles, thereby increasing their dispersibility.

The solid particles containing the (thermally treated) layered material preferably have a high accessibility, thereby being less vulnerable to blockage during the process.

The particulate inorganic material suitably has a mean particle diameter in the range of from 1 to 500 micrometers, preferably from 10 to 150 micrometers.

Following are examples of specific layered materials suitable for use in the present process.

Smectite

Smectites are the 2:1 clay minerals that carry a lattice charge and characteristically expand when solvated with water and alcohols. The layers are negatively charged. Between the layers, cations are hosted. Examples of smectites are montmorillonite and saponite, which are Mg-, Al-, and Si-containing smectites.

Naturally occurring or synthetically prepared smectites can be used. A method for preparing Mg-, Al-, and Si-containing smectites is disclosed in WO 01/12319. Thermal treatment, e.g. calcination at temperatures in the range 300-900° C., leads to the formation of activated smectite clays.

Anionic Clay

Anionic clays are layered structures corresponding to the general formula [$M_{m}^{2+}M_{n}^{3+}(OH)_2$ $_{m+2n}$.]($X_{n/zz-}$). $bH_2O$ wherein $M^{2+}$ is a divalent metal, $M^{3+}$ is a trivalent metal, m and n have a value such that m/n=1 to 10, preferably 1 to 6, and b has a value in the range of from 0 to 10, generally a value of 2 to 6, and often a value of about 4. X is an anion with valance Z, such as $CO_3^{2-}$, $OH^-$, or any other anion normally present in the interlayers of anionic clays. It is more preferred that m/n should have a value of 2 to 4, more particularly a value close to 3.

In the prior art, anionic clays are also referred to as layered double hydroxides and hydrotalcite-like materials.

Anionic clays have a crystal structure consisting of positively charged layers built up of specific combinations of metal hydroxides between which there are anions and water molecules. Hydrotalcite is an example of a naturally occurring anionic clay in which Al is the trivalent metal, Mg is the divalent metal, and carbonate is the predominant anion present. Meixnerite is an anionic clay in which Al is the trivalent metal, Mg is the divalent metal, and hydroxyl is the predominant anion present.

In hydrotalcite-like anionic clays the brucite-like main layers are built up of octahedra alternating with interlayers in which water molecules and anions, more particularly carbonate ions, are distributed. The interlayers may contain anions such as $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such as $V_{10}O_{28}^{6-}$ and $Mo_7O_{24}^{6-}$, monocarboxylates such as acetate, dicarboxylates such as oxalate, alkyl sulfonates such as lauryl sulfonate.

Upon thermal treatment at a temperature above about 200° C., anionic clays are transformed into so-called solid solutions, i.e. mixed oxides that are rehydratable to anionic clays. At higher temperatures, above about 800° C., spinel-type structures are formed. These are not re-hydratable to anionic clays.

The thermally treated anionic clay that can be present in the solid particles to be used in the process of the present invention can be a solid solution or a spinel-type material.

For the purpose of the present invention various types of (thermally treated) anionic clays are suitable. Examples of suitable trivalent metals ($M^{3+}$) present in the (thermally treated) anionic clay include $Al^{3+}$, $Ga^{3+}$, $In^{3+}$, $Bi^{3+}$, $Fe^{3+}$, $Cr^{3+}$, $Co^{3+}$, $Sc^{3+}$, $La^{3+}$, $Ce^{3+}$, and combinations thereof. Suitable divalent metals ($M^{2+}$) include $Mg^{2+}$, $Ca^{2+}$, $Ba^{2+}$, $Zn^{2+}$, $Mn^{2+}$, $Co^{2+}$, $Mo^{2+}$, $Ni^{2+}$, $Fe^{2+}$, $Sr^{2+}$, $Cu^{2+}$, and combinations thereof. Especially preferred anionic clays are Mg—Al and Ca—Al anionic clays.

Suitable anionic clays can be prepared by any known process. Examples are the co-precipitation of soluble divalent and trivalent metal salts and slurry reactions between water-insoluble divalent and trivalent metal compounds, e.g. oxides, hydroxides, carbonates, and hydroxycarbonates. The latter method provides a cheap route to anionic clays.

Layered Hydroxy Salts

Metal hydroxy salts (LHS) are distinguished from anionic clays in that they are built up of divalent metals only, whereas layered double hydroxides are built up of both a divalent and a trivalent metal.

An example of a LHS is a hydroxy salt of a divalent metal according to the following idealized formula: [($Me^{2+}$, $M^{2+}$) $2(OH)3]+(X_{n-})1/n$], wherein $Me^{2+}$ and $M^{2+}$ may be the same or different divalent metal ions and $X_{n-}$ is an anion other than $OH^-$. Another example of LHS has the general formula [($Me^{2+}$, $M^{2+}$)$5(OH)8]2+(X_{n-}2/n$], wherein $Me^{2+}$ and $M^{2+}$ may be the same or different divalent metal ions and X is an anion other than $OH^-$.

If the LHS contains two different metals, the ratio of the relative amounts of the two metals may be close to 1. Alternatively, this ratio may be much higher, meaning that one of the metals predominates over the other. It is important to appreciate that these formulae are ideal and that in practice the overall structure will be maintained, although chemical analysis may indicate compositions not satisfying the ideal formula.

Examples of suitable layered hydroxy salts with one type of metal are Zn-LHS (e.g. $Zn_5(OH)_8(X)_2$, $Zn_4(OH)_6 \times$, $Zn_5(OH)_6(X)_2.2H_2O$, $Zn_3(OH)_4(X)_2$), Co-LHS (e.g. $CO_2(OH)3 \times$, Ni-LHS (e.g. $Ni_2(OH)_3X$), Mg-LHS (e.g. $Mg_2(OH)_3 \times$), Fe-LHS, Mn-LHS, and La-LHS ($La(OH)_2NO_3$). Examples of suitable layered hydroxy salts comprising two or more different types of metals are Zn—Cu LHS, Zn—Ni LHS, Zn—Co LHS, Fe—Co LHS, Zn—Mn LHS, Zn—Fe LHS, Ni—Cu LHS, Cu—Co LHS, Cu—Mg LHS, Cu—Mn LHS, Fe—Co LHS, Ni—Co LHS, Zn—Fe—Co LHS, Mg—Fe—Co LHS, and Ni—Cu—Co LHS. Especially preferred layered hydroxy salts are Zn—Mn LHS and Zn—Fe LHS.

Examples of suitable interlayer anions $X_{n-}$ are $NO_3^-$, $OH^-$, $Cl^-$, $Br^-$, $I^-$, $SO_4^{2-}$, $SiO_3^{2-}$, $CrO_4^{2-}$, $BO_3^{2-}$, $MnO_4^-$, $HGaO_3^{2-}$, $HVO_4^{2-}$, $ClO_4^-$, $BO_3^{2-}$, pillaring anions such as $V_{10}O_{28}^{6-}$ and $Mo_7O_{24}^{6-}$, monocarboxylates such as acetate, dicarboxylates such as oxalate, alkyl sulfonates such as lauryl sulfonate.

LHS exchanged with (bi)carbonates or organic anions provides the advantage that upon calcination, the anion will decompose, thereby increasing the porosity and surface area of the LHS.

Suitable methods for the preparation of layered hydroxy salts involve the reaction of a metal oxide with a dissolved metal salt (see Inorg. Chem. 32 (1993) 1209-1215) and co-precipitation from metal salt solutions (see J. Solid State Chem. 148 (1999) 26-40 and J. Mater. Chem. 1 (1991) 531-537). After preparation of the LHS, the interlayer anions may be exchanged, if so desired, by a regular ionexchange procedure.

Upon thermal treatment of a LHS at a temperature above 300° C., metal oxides or mixed metal oxides are formed.

An alternate process involves the use of an extruder and/or a kneader. Kneading is very suitable to provide homogeneous and intimate mixing and allows for reactions to take place, while extrusion provides high shear mechanical treatment of the materials which aids the dissolution the biomass composites and facilitates the transport of the materials. In particular the use of a screw extruder is preferred for use herein, because it allows for operation at high pressures without requiring expensive equipment.

It will be understood that the mixing step may be combined with the process of reducing the particle size of the biomass material. For example, ball milling or grinding of the biomass in the presence of a particulate solid material will result in an intimate mixture of the biomass and the particulate solid material.

Focusing now on the use of an extruder and/or kneader for the purpose of activating the biomass, it is possible to operate the process at increased temperature. Many screw extruders are provided with a heating mantle through which steam or heated oil may be circulated. It is also possible to inject steam into nozzles provided in predetermined locations of the barrel. Steam injection provides a combined effect of heating the biomass and adding a solvent (water).

The pressure inside the extruder is determined by the viscosity of the mass within the extruder, the design of the screw within the extruder (for example, a tapered pitch screw provides a higher pressure than a constant pitch screw), and the design of the perforated plate at the outlet of the extruder. The back pressure provided by this plate is a function of the amount of open area in relation to the amount of closed area, with lower open area/closed area ratios providing greater back pressure.

If a single pass through an extruder does not provide sufficient mixing, two or more extruders may be provided in series, or the material may be subjected to two or more passes through one extruder. Similarly, the capacity of a plant may be readily increased by operating two or more extruders in parallel.

Suitable solvents for use in step b) include water, alcohols (in particular ethanol and glycerol), bio-oil or other products from the subsequent conversion of the biomass, liquid acids, aqueous solutions of acids and bases, liquid CO2, and the like. Water is the preferred solvent in most applications, because of its availability, low cost, and ease of handling. Liquids that are produced during the subsequent conversion of the biomass are also readily available and may be preferred for that reason.

Suitable solid materials for use in step a) include solid acids and bases, salts, minerals, clays, layered materials, and the like. Solid materials having catalytic properties are preferred. Examples include metal oxides, metal hydroxides, alkaline and alkaline earth oxides, hydroxides, carbonates, hydroxyl carbonates, hydrotalcite-like materials, etc. As has been noted earlier, it may be desirable to add several solid materials to the biomass, or a combination of one or more solid materials and one or more solvents.

When kneading and/or grinding biomass with a solid inorganic particulate material it may be possible to form a co-crystal of a crystallizable component of the biomass (e.g., cellulose) and the inorganic material. The formation of such a co-crystal may be confirmed by an XRD pattern showing a crystal structure that is different from that of the biomass starting material and different also from the crystal structure of inorganic material. (See reference: Chem. Cornmun" 2002, 2372-2373, "Mechanochemistry and co-crystal formation: effect of solvent on reaction kinetics", Ning Shan, Fumio Toda and \j\fjlliam Jones)

Similarly, it is possible to add precursors of inorganic solids, and causing them to solidify or even crystallize during the mixing process. For example, certain inorganic solids may precipitate from solution in response to an increase in temperature or a change in pH. An increase in temperature may be effected in the kneader by heating the barrel, or by injecting steam. A pH change may be effected by injecting a solution of an acid or a base. Similarly, amorphous materials may be caused to crystallize by increasing the temperature of the mixture.

As mentioned above, the addition of a solvent is optional. For example, in many cases water is the solvent of choice. Many forms of non-edible biomass contain sufficient quantities of water for the present purpose, obviating the need for adding additional solvent. It may even be desirable to remove water during the activation step. This may for example be accomplished by heating the biomass to a temperature above 100 DC, and letting off steam via pressure valves located along the barrel of the extrude, if an extruder is used in the process.

In many cases conversion step c) commences while the activated biomass is still being processed in the kneader or extruder or in both. If this process is not completed in the kneader, the activated biomass may be processed further in a second kneader, or it may be subjected to a second pass through the first kneader. Alternatively, the biomass may be transferred to a different processor to complete step c). A suitable example of such a processor is a filter press, which can be operated at desirable conditions of temperature and pressure.

It is highly preferred that liquid products resulting from conversion step c) be separated from unconverted biomass. The purpose of this separation is twofold. Firstly, it reduces the mass of material that needs to be subjected to further conversion in step d), which makes the operation of step d) more efficient. Secondly, it avoids subjecting liquid conversion products from step c) to the subsequent conversion process, avoiding a degradation of this liquid product by such further processing.

In a specific embodiment, part of the first conversion takes place in a filter press under conditions of increased temperature and pressure. This may be accomplished by loading the activated biomass into a filter press, and injecting steam to increase both the temperature and the pressure. After this first conversion step is completed the filter press is de-pressurized over a filter medium, such as a filter cloth or screen, and the reaction product is separated into a liquid filtrate stream and a filter cake. The liquid stream comprises solvent and liquid conversion product, as well as fine particles of unconverted biomass. The filter cake comprises unconverted biomass, retained solvent, and liquid reaction product.

As used herein, the term "unconverted biomass" refers to biomass that has not been converted to a liquid product in step c). The term includes biomass material that has not undergone any chemical conversion. The term also includes biomass that has undergone some conversion, but insufficient to form a liquid. For example, cellulose may have been converted to cellulose of a lower average molecular weight, but still be solid. This would be considered "unconverted biomass" within the meaning of this term as used herein. Such a material may well be an "activated unconverted biomass" if its molecular weight is reduced and/or its macro and/or micro structure has changed, in a way that makes it more susceptible for conversion to a liquid product in step d).

In the alternative the liquid may be separated from remaining solids by nanofiltration or membrane separation. Instead of a filtration technique an extractive separation may be used.

The unconverted biomass from step c) contains the component of the biomass that is sometimes referred to as "recalcitrant cellulose". This is the part of the cellulose that is not readily converted under mild conditions. Dependent on the biomass source, this recalcitrant cellulose may be predominantly lignin, or crystalline cellulose, or both.

The unconverted cellulose is subjected to a second conversion process in step d). If the liquid conversion product of step c) is removed from the unconverted biomass prior to step d), this second conversion may be carried out under more severe conditions than the first conversion, without risking degradation of reaction products already formed. For example, the unconverted biomass may be subjected to a conventional HTU or pyrolysis process.

In a preferred embodiment of the process of the present invention, the unconverted biomass is activated prior to step d) so that step d) may be carried out under less severe conditions than the prior art HTU and pyrolysis processes. In many cases the unconverted biomass from step c) is already activated, for example because inorganic particulate materials added in step a) are carried over with the unconverted biomass into step d). The unconverted biomass may also be activated as a result of a partial conversion in step c), insufficient to render the biomass liquid, but sufficient to make it more susceptible to further conversion.

Any conversion process is suitable for use in step d). HTU and pyrolysis have already been mentioned; desirably, these processes are conducted under conditions as mild as the activation of the biomass will permit. Gasification may be a desirable option, for example to create gaseous fuel for meeting the heat requirements of the overall process. In some cases the activated unconverted biomass may be converted to ethanol by enzymatic fermentation.

In most cases, both steps c) and d) produce a mixture of liquid biomass derivative compounds, jointly referred to as "bio-oil". This bio-oil may be converted to suitable liquid transportation fuels in modified refinery processes such as fluid catalytic cracking, hydroconversion, thermal conversion, and the like. In these processes the bio-oil may be the sole feedstock, or it may be blended with conventional, crude oil-based feedstocks.

In another embodiment the activation step a) is conducted in a kneader/extruder assembly in the presence of an inorganic solid, for example an alkaline or alkaline earth metal oxide or hydroxide, and the product of step c) is hydrothermally treated in step d). The inorganic material which is homogenously mixed in step a)/step b) is thus most effectively dispersed and present in steps c) and/or d) in intimate contact with the unconverted biomass, resulting in an efficient conversion. Said solids may possess catalytic properties that further enhance the conversion process.

In another embodiment the inorganic additive introduced in step a) may be simply a heat transferring medium, like for example sand, clay or a mineral, ore or soil, which may have also catalytic properties. In this case the product of step c) can be subjected to a pyrolysis conversion process. The advantage of this process is that here the heat transfer medium is in close and intimate contact with the biomass in a dispersed form.

In another embodiment the activation in step a) may involve the addition of an acid or a base, which, aided by the application of heat and/or steam, will break down the compact structure of the biomass composite, rendering it more susceptible to a subsequent conversion, for example by acid hydrolysis and/or enzymatic conversion.

In another embodiment the biomass in step a) containing water and optionally an additive is heated above 100 DC, while being mechanically treated, so that the water is allowed to evaporate.

In another embodiment, the biomass is mechanically processed in the presence of other carbonaceous materials such as coal, lignite, tar sands and shale in step a) and step b) optionally with the addition of additives, followed by gasification of the unconverted materials.

In another embodiment shaped bodies produced in step a), b) and/or c) containing optionally an additive may be thermally treated to cause further biomass dissolution and subsequently treated with enzymes.

In another embodiment shaped bodies produced in step a), b) and/or c) containing optionally an additive may be hydrothermally treated to cause further biomass dissolution, and subsequently treated with enzymes.

In another embodiment the biomass is intimately mixed with an additive in a ball mill, grinding the components together to form the activated biomass. Optionally a liquid solvent can be added.

In another embodiment the biomass is grinded with an additive in a fluidized and/or spouted bed. Optionally a liquid solvent can be added.

In another embodiment the unconverted biomass of step c), which in many cases appears to be the fibrous crystalline cellulose component of the biomass coated with an additive, is converted to paraffins suitable for diesel fuels.

In another embodiment the fibrous crystalline cellulose coated with an catalytically active additive is converted to diesel, according to or similar to the reactions scheme as suggested by Huber et al., see: G. W. Huber, J. N. Chheda, C. J. Barrett, J. A. Dumesic, Science 308 (2005) 1446.

In another embodiment the unconverted biomass of step c), which often appears to be the fibrous crystalline cellulose coated with an additive, is converted to materials suitable for paper, board or construction materials [00108] In another embodiment the unconverted material (mainly crystalline cellulose) is converted to a transportation fuel by aqueous phase reforming as suggested by Huber et al., see: G. W. Huber, J. N. Chheda, C. J. Barrett, J. A. Dumesic, Science 308 (2005) 1446.

In another embodiment the solubilized material is converted to a transportation fuel by aqueous phase reforming as suggested by Huber et al., see: G. W. Huber, J. N. Chheda, C. J. Barrett, J. A. Dumesic, Science 308 (2005) 1446.

In another embodiment the unconverted material of step b and/or c) is first submitted to electromagnetic and/or ultrasound energy, optionally in the presence of a polar solvent such as ethanol. Following this treatment the so activated material is converted by any of the above means.

In another embodiment the unconverted material of step b and/or c), which comprises a material susceptible to the absorption of electro-magnetic radiation is first submitted to electromagnetic optionally in the presence of a polar solvent such as ethanol.

Following this treatment the so activated material is converted by any of the above means. In another embodiment the unconverted material of step b and/or c) is first submitted to intimate mixing with an additive, optionally in the presence of a solvent such as ethanol. Following this treatment the so activated material is converted by any of the above means.

Thus, the invention has been described by reference to certain embodiments discussed above. It will be recognized that these embodiments are susceptible to various modifications and alternative forms well known to those of skill in the art.

Example 1

Saw dust was prepared by repeatedly sawing through a piece of construction lumber with a circular saw. Judged by appearance the saw dust particles were predominantly rod-like in shape, and had a mean average larger particle dimension of about 1-2 mm, and a smaller particle dimension of about 0.5 mm.

Experiments were carried out in 2 mL glass test tubes, able to withstand pressures well in excess of 10 bar. The test tubes were provided with Bakelite stoppers, which were equipped with pressure gauges for monitoring the pressure inside the test tubes. The test tubes were provided with magnetic stirrers, and heated in an oil bath. In all experiments the oil bath was kept at 180° C. The pressure inside the test tubes was 10 bar, corresponding with a temperature inside the tubes of 180° C.

Hydrotalcite ("HTC") from Aldrich, which is magnesium aluminum hydroxycarbonate of the formula $Mg_6Al_2(CO_3)(OH)_{16}.4H_2O$, CAS number 11097-59-9, was calcined in air for 1 hour at 650° C.

In one of the 2 mL test tubes were weighed 90 mg of saw dust, 21 mg of the calcined HTC, and 1390 mg distilled $H_2O$. The mixture was heated at 180° C. under stirring for 1 hour (sample B1).

In a comparative example a separate sample of saw dust from the same source was heated in distilled water, under stirring, for 1 hour at 180° C., in the absence of HTC or any other additives (sample A2).

In a second example according to the invention an uncalcined sample (21 g) of HTC was slurried with 89 mg saw dust and 1440 mg distilled water, and heated under stirring at 180° C. for 1 hour (sample B2).

The treated saw dust samples were judged visually for the percentage of liquefaction, and compared under an optical microscope with a virgin saw dust sample (sample A1)

The results are compiled in the following table:

| Sample | % liquefaction | Observation |
|---|---|---|
| A1 | 0% | Reference |
| A2 | <10% | No observable changes; structure of fibers and cells as in sample A1. |
| B1 | About 40% | Wood cells have disappeared; only here and there isolated cell debris still visible. |
| B2 | >10%, <40% | HTC particles apparently hydrophobic; effect less pronounced than in B1; some cell material had been destroyed, but intact cell still present. |

The results indicate that the hemicellulose and lignin components of the saw dust particles were fully liquefied in experiment B1, but that most of the crystalline cellulose had remained solid. The uncalcined hydrotalcite sample (experiment B2) was apparently hydrophobic. The particles may have been coated with an organic material, such as stearic acid, which is often done to make the particles compatible with synthetic polymeric materials. Calcination made the hydrotalcite more effective because the material was hydrophilic after calcination. In addition, calcination is known to make layered materials such as HTC more catalytically active.

The experiments are repeated with particles of kaolin, bentonite, montmorillonite, Zn-LHS, and ZnO/FeO mixed metal oxide, respectively. Similar results are obtained.

Example 2

Biomass material made from White Pine wood milled to an average particle size of 500 micrometers is dispersed in a solution containing $Mg(NO_3)$ and $Al(NO_3)_3$ The Mg/Al mole ratio for this solution is 3. The resulting slurry is stirred for thirty minutes to allow maximum penetration of the solution into the wood particles. The excess solution is drained off and the resulting wet biomass material re-slurried in sodium hydroxide solution such that the final pH is 9 to 10.

The resulting slurry is divided into two portions. The first portion is aged at 85° C. for six hours. The second portion is aged at 180° C. for one hour.

The resulting slurries are filtered and dried.

The presence of a mixture crystalline cellulose and HTC is confirmed by x-ray diffraction in both samples with the higher temperature treatment showing higher crystallinity.

Thermal decomposition of these samples is performed using a MettlerToledo TGA/SDTA851e thermo balance. The samples (10-15 mg) are placed into alumina cup (70 ml) and heated from 25 to 700° C. at a heating rate 5° C. min-1 under Ar (Argon) flow (30 ml/min).

DTG curves are calculated from the corresponding weight versus temperature curve. Total weight loss is determined as the difference between initial (at 25° C.) and remaining weight (at 600° C.) of the sample. In the case of biomaterial-catalyst mixture total weight loss is determined by subtracting the amount of catalyst from the initial and remaining weight assuming that catalyst does not change during the experiment.

The weight loss for the two samples containing in-situ HTC are about 5 to 10% higher than the untreated wood, while the decomposition of these wood samples starts at a lower temperature than the untreated wood.

Example 3

White Pine wood chips are initially pulverized with a mechanical mixer for 5 min to reduce the particle size to about 5 mm. This wood material is wet milled (15 wt % slurry based on weight of wood) along with raw natural magnesite powder (wood to magnesite ratio of 10:2) in a planetary high energy mill (Puverisette 6) for three hours. The slurry is dried at 100° C.

The presence of the inorganic phase, $MgCO_3$ along with cellulose is confirmed by X-ray diffraction.

Using the same method described in Example 2 above, the weight loss for the dried wood sample treated with magnesite is about 5 to 10% higher than the untreated wood, while the decomposition of the wood starts at a lower temperature than the untreated wood.

Example 4

Repeat Example 3 replacing magnesite powder with $MgCl_2$ solution (wood to $MgCl_2$ ratio of 10:2). The final slurry is 15% solids based on the weight of the wood.

The presence of the inorganic phase along with cellulose is confirmed by X-ray diffraction.

Using the same method described in Example 2 above, the weight loss for the dried wood sample treated with $MgCl_2$ is about 5 to 10% higher than the untreated wood, while the decomposition of the wood starts at a lower temperature than the untreated wood.

Example 5

A small amount of water (2% based on the weight of the wood) is added to a mixture of biomass material of White Pine wood (average particle size of 500 millimicrons) and magnesite powder is milled in a planetary high energy mill (Pulverisette 6) for three hours.

The presence of the inorganic phase, $MgCO_3$ along with cellulose is confirmed by X-ray diffraction.

Using the same method described in Example 2 above, the weight loss for the dried wood sample treated with magnesite is about 5 to 10% higher than the untreated wood, while the decomposition of the wood starts at a lower temperature than the untreated wood.

Example 6

Repeat Example 5, where the water is replaced by ethanol.

The presence of the inorganic phase, MgCO3 along with cellulose is confirmed by x-ray diffraction.

Using the same method described in Example 2 above, the weight loss for the dried wood sample treated with magnesite is about 5 to 10% higher than the untreated wood, while the decomposition of the wood starts at a lower temperature than the untreated wood.

What is claimed is:

1. A process for converting biomass to bio-oil, the process comprising:
   (a) mixing biomass and at least one inorganic material having catalytic properties, wherein the at least one inorganic material includes a kaolin, a zeolite, or a mixture thereof; and
   (b) converting at least a portion of the biomass to liquid organic compounds.

2. The process of claim 1, wherein the at least one inorganic material includes a kaolin selected from the group consisting of: dealuminated kaolin, acid leached kaolin, calcined kaolin, and a combination thereof.

3. The process of claim 1, wherein the at least one inorganic material includes a zeolite.

4. The process of claim 3, wherein the at least one inorganic material is selected from the group consisting of: zeolite X, zeolite REY, zeolite RE-USY, zeolite Y, zeolite USY, dealuminated USY zeolite, zeolite ZSM-5, beta zeolite, a silicalite, and a mixture of any two or more of the foregoing.

5. The process of claim 4, wherein the at least one inorganic material includes ZSM-5.

6. The process of claim 5, wherein the at least one inorganic material includes a mixture of ZSM-5 and dealuminated kaolin.

7. The process of claim 5, wherein the at least one inorganic material includes a mixture of ZSM-5 and calcined kaolin.

8. The process of claim 1, wherein the at least one inorganic material includes solid particles.

9. The process of claim 8, wherein the solid particles have a mean particle diameter ranging from 1 µm to 500 µm.

10. The process of claim 1, wherein the at least one inorganic material is thermally treated prior to step (a).

11. The process of claim 1, wherein the at least one inorganic material is a heat transferring medium, and step (b) includes heating the combination at an elevated temperature.

12. The process of claim 1, wherein the biomass includes wood chips.

13. The process of claim 1, further including milling the biomass before step (a).

14. The process of claim 13, wherein the biomass following milling has a mean particle diameter of less than 3 mm.

15. The process of claim 13, further including mixing the milled biomass and a solvent to form a slurry before step (a).

16. The process of claim 15, wherein the solvent includes water, alcohol, bio-oil, a liquid acid, an aqueous acid solution, an aqueous basic solution, liquid $CO_2$, or mixtures thereof.

17. The process of claim 1, wherein the biomass includes water, the process further including removing at least a portion of the water from the biomass before step (a).

18. The process of claim 17, further including removing the water from the biomass by heating the biomass at a drying temperature above 100° C.

19. The process of claim 1, wherein step (a) further includes ball milling or grinding the biomass with the at least one inorganic material.

20. The process of claim 1, wherein step (a) further includes adding an acid or a base to the biomass.

21. The process of claim 1, wherein step (b) includes converting at least a portion of the biomass to bio-oil via at least one conversion process, wherein the at least one conversion process includes hydrothermal upgrading, at least partial pyrolysis, or enzymatic fermentation.

22. The process of claim 1, wherein step (b) further includes converting at least a portion of the biomass to the liquid organic compounds via a first conversion process, wherein the liquid organic compounds include a bio-oil.

23. The process of claim 22, wherein step (b) further includes separating unconverted biomass from the liquid organic compounds after the first conversion process.

24. The process of claim 23, wherein the unconverted biomass includes solid material.

25. The process of claim 23, wherein step (b) further includes converting at least a portion of the unconverted biomass to bio-oil via a second conversion process.

26. The process of claim 23, wherein the second conversion process operates at a temperature greater than an operating temperature of the first conversion process.

27. The process of claim 26, wherein the second conversion process is a pyrolysis process.

28. The process of claim 1, further including:
   (c) converting the liquid organic compounds to fuel.

29. The process of claim 28, wherein step (c) further includes converting the liquid organic compounds to fuel via at least one of fluid catalytic cracking, hydroconversion, thermal conversion, or combinations thereof.

30. The process of claim 28, wherein step (c) further includes blending the liquid organic compounds with crude oil-based feedstock.

31. A process for converting biomass to liquid organic compounds, comprising:
   milling biomass into particles having a mean particle diameter of less than 3 mm;
   drying the milled biomass to at least partially remove water present within the biomass;
   utilizing a catalyst comprising: 1) ZSM-5 and 2) a kaolin; and
   converting at least a portion of the milled and dried biomass to the liquid organic compounds by heating the biomass in the presence of the catalyst.

32. The process of claim 31, wherein the biomass includes wood chips.

33. The process of claim 31, wherein the biomass is milled into particles having a mean particle diameter ranging from about 0.1 mm to about 1.0 mm.

34. The process of claim 31, wherein the catalyst comprising ZSM-5 and dealuminated kaolin is thermally treated.

35. The process of claim 31, wherein the step of converting at least a portion of the milled and dried biomass to the liquid organic compounds includes a pyrolysis reaction.

36. The process of claim 31 further including: converting the liquid organic compounds to fuel via at least one of fluid catalytic cracking, hydroconversion, thermal conversion, or combinations thereof.

37. The process of claim 36, wherein the wood chips are milled to a mean particle diameter ranging from about 0.1 mm to about 1.0 mm.

38. The process of claim 36, further including combining the milled and dried wood chips and a solvent to produce a slurry following the drying step.

\* \* \* \* \*